United States Patent [19]

Watanabe et al.

[11] Patent Number: 5,639,511
[45] Date of Patent: Jun. 17, 1997

[54] PROCESS FOR PRODUCING LIQUID CRYSTAL DEVICE

[75] Inventors: Yasuyuki Watanabe, Chigasaki; Toshifumi Yoshioka, Hadano; Keishi Danjo, Kamakura, all of Japan

[73] Assignee: Canon Kabushiki Kaisha, Tokyo, Japan

[21] Appl. No.: 440,880

[22] Filed: May 15, 1995

Related U.S. Application Data

[62] Division of Ser. No. 293,608, Aug. 22, 1994, abandoned, which is a continuation of Ser. No. 899,363, Jun. 16, 1992, abandoned.

[30] Foreign Application Priority Data

Jun. 20, 1991 [JP] Japan ............................ 3-174800

[51] Int. Cl.$^6$ .......................................... B05D 5/06
[52] U.S. Cl. .................. 427/162; 427/108; 427/226; 427/287; 427/385.5; 427/389.7
[58] Field of Search ........................ 427/108, 162, 427/385.5, 389.7, 287, 226

[56] References Cited

U.S. PATENT DOCUMENTS

| | | | |
|---|---|---|---|
| 1,773,949 | 8/1930 | Casto | 101/415.1 |
| 2,974,586 | 3/1961 | Hunt | 101/157 |
| 3,749,014 | 7/1973 | Gates | 101/157 |
| 4,026,210 | 5/1977 | Merzazora | 101/169 |
| 4,466,349 | 8/1984 | Bartlett | 101/415.1 |
| 5,134,936 | 8/1992 | John | 101/157 |
| 5,190,794 | 3/1993 | Yoshino et al. | 427/162 |

FOREIGN PATENT DOCUMENTS

| | | |
|---|---|---|
| 0257103 | 3/1988 | European Pat. Off. |
| 282786 | 7/1914 | Germany |
| 1525805 | 9/1978 | United Kingdom |
| 2043537 | 10/1980 | United Kingdom |

OTHER PUBLICATIONS

Patent Abstracts of Japan, vol. 5, No. 37 (Mar. 1981) (M-058).
Patent Abstracts of Japan, vol. 10, No. 143 (May 1986) (P-459).

*Primary Examiner*—Janyce Bell
*Attorney, Agent, or Firm*—Fitzpatrick, Cella, Harper & Scinto

[57] ABSTRACT

In a transfer printing apparatus having a blade-form ink extender and an ink extension member for extending an ink thereon in association with the ink extender, there is provided a means for removing an excess of the ink from the ink extender and/or and the ink extension member. The transfer printing apparatus is suitably used for forming a film of an organic polymer or an inorganic oxide in a process for production of a liquid crystal device.

6 Claims, 3 Drawing Sheets

1

PROCESS FOR PRODUCING LIQUID CRYSTAL DEVICE

This application is a division, of application Ser. No. 08/293,608, filed Aug. 22, 1994, now abandoned, which is a continuation of application Ser. No. 07/899,363, filed Jun. 16, 1992, now abandoned.

FIELD OF THE INVENTION AND RELATED ART

The present invention relates to a transfer printing system wherein an ink is extended on an extension member by an extender blade, the extended ink is taken up by a printing plate, and the resultant ink image on the plate is transferred to a substrate to be printed.

In recent years, a flexographic apparatus has been introduced in a patterned film forming step in a liquid crystal cell production process, and the applicability thereof to a wide scope of materials has called attention. For example, the utilization of a flexographic apparatus has been considered, first for application of an alignment material, such as polyimide, and also for application of an insulating material to be formed by sintering, a sealing material and various resists.

The advantages accompanying the use of a flexographic apparatus, e.g., when used in production of liquid crystal cells, may include:

(1) a decrease in production cost due to omission of a patterning step, (2) an improvement in product performance due to removal of adverse effects accompanying the use of a resist and a patterning step, (3) a reduction of an equipment cost and an increase in throughput compared with the case of using a film-forming apparatus, (4) an improved performance due to protection of a print surface compared with the case of using the screen printing.

Thus, the advantages are extensive and remarkable including improvements in liquid crystal cell performances, decrease in production cost and enhanced productivity.

A commercially available example of the flexographic apparatus which may be used for the above purpose, is "Angstromer" (trade name, available from Nihon Shashin Insatsu K. K.). The apparatus has been characterized by its capability of controlling a thin film thickness with the use of an ink having a relatively low viscosity of from several cp (centipoise) to two-to-three hundreds cp.

The apparatus is provided with two types of printing mechanisms as shown in FIGS. 5 and 6. According to these mechanism, an ink 3 is extended on an extension member of an extension roller 2 (FIG. 5) or an extension plate 8 (FIG. 6), respectively, of a metal by a blade-form extender member, such as a doctor blade 1, and the extended ink is taken up by a printing plate 5 of a rubber fastened to a cylinder roller 4 and transferred to a rigid substrate to be printed (as shown in FIG. 7 corresponding to FIG. 6), such as a glass plate 8 supported on a movable stage 7 (FIG. 5) or a fixed stage 7a (FIG. 6). An excessive amount of the ink on the extension member (8, 8a) is removed by the extender blade and received by an ink-receiving pan (9, 9a).

The printed film thickness is principally controlled by the viscosity of the ink and the rate of opening and depth of a fine groove pattern formed on the extension roller 2 or extension plate 8.

In operation of such a transfer printing apparatus by using a wider scope of ink materials, there has been encountered a difficulty arising from differences in viscosity and volatility of the inks which is expected to be solved by an improvement in the apparatus.

A difficulty is encountered when an ink having a viscosity of 500 cp or higher is used in the apparatus shown in FIG. 5. More specifically, an excessive amount of the ink remains at the tip of the doctor blade 1, whereby the extending pressure exerted by the doctor blade 1 is affected by the remaining ink to change the extending and therefore the printing conditions.

In the case of operating the apparatus shown in FIG. 6 by using an ink having a viscosity of 25 cp to 1,000 cp, an amount 3a of the ink remaining at the tip of the doctor blade is liable to fall on the extension plate 8 to cause a printing failure in the operation state shown in FIG. 7.

SUMMARY OF THE INVENTION

In view of the above problems, a principal object of the present invention is to provide a transfer printing apparatus capable of being applied to a wider scope of inks having a wider viscosity range while solving the above problems.

Another object of the present invention is to provide a process for producing liquid crystal devices capable of showing an improved productivity by using such a transfer printing apparatus.

According to the present invention, there is provided a transfer printing apparatus, comprising: a projecting extender, an extension member for extending an ink thereon in association with the projecting extender, a printing plate for taking up the extended ink and transferring the ink to a substrate to be printed, and also a removal means for an excess of the ink after extension from the projecting extender and/or the extension member.

According to another aspect of the present invention, there is provided a process for producing a liquid crystal device including a step of applying a solution of an organic polymer or an inorganic oxide precursor to form a film of an organic polymer or an inorganic oxide by using the above-mentioned transfer printing apparatus.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the present invention, a roller-shaped extension member, for example, may be provided with a groove to remove an excessive amount of ink, and a flat plate-shaped extension member may be provided with an ink-removing member which is attached by an extender blade after passing the ink-extension surface of the extension plate to remove an excess ink.

The transfer printing apparatus according to the present invention may particularly suitably be used for applying a solution containing an organic polymer or an inorganic oxide precursor.

Hereinbelow, some preferred embodiments of the present invention will be described with reference to the drawings.

Figures 1A, 1B, 1C:
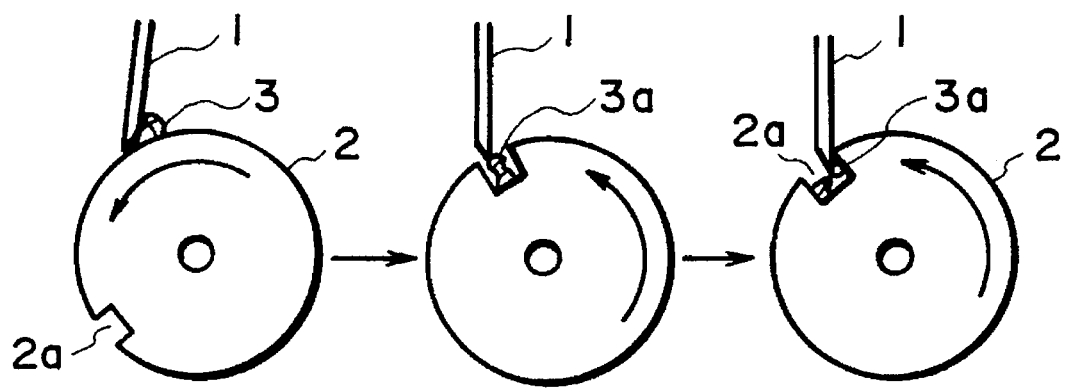
FIGS. 1A, 1B, and 1C are side views for illustrating the extending and ink-removing actions of an extension roller in a flexographic apparatus according to an embodiment of the present invention.
Figure 5:
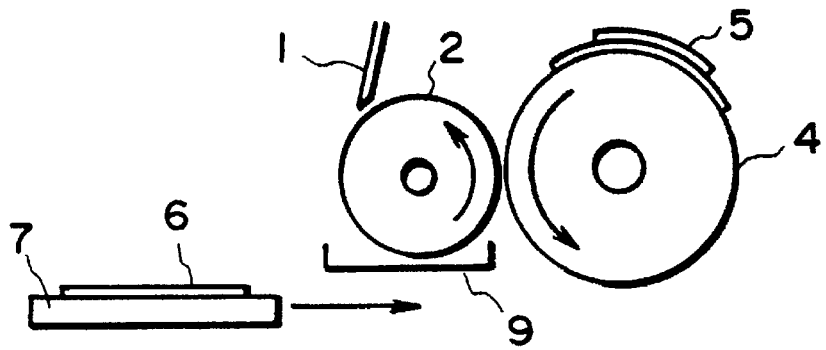
FIG. 5 is a side view for illustrating a printing operation of a printing mechanism used in a conventional flexographic apparatus.

FIGS. 1A, 1B and 1C illustrate a structure and an action of a printing mechanism, particularly an extension mechanism, in a flexographic apparatus according to an embodiment of the present invention. Referring to these figures, the mechanism includes a doctor blade 1 and an extension roller 2 equipped with a groove 2a, and is suitably used in a printing apparatus of the type using an extension roller as shown in FIG. 5. As shown in FIGS. 1A, 1B and 1C, the extension roller 2 is provided with a groove 2a for removing an excess of ink 3a remaining on the doctor blade 1.

More specifically, an ink 3 is extended on the extension roller 2 by the doctor blade 1 (FIG. 1A), and an excess 3a of the ink remaining at the tip of the doctor blade is caused to fall in the groove 2a (FIG. 1B) and further scraped off by the edge of the groove 2a (FIG. 1C). As a result, it has been confirmed that inks with a broader range of viscosity can be extended and applied without causing extension irregularity, and a continuous running time is remarkably prolonged by suppressing a viscosity increase of the ink left attached to the tip of the doctor blade 1.

Figure 2:
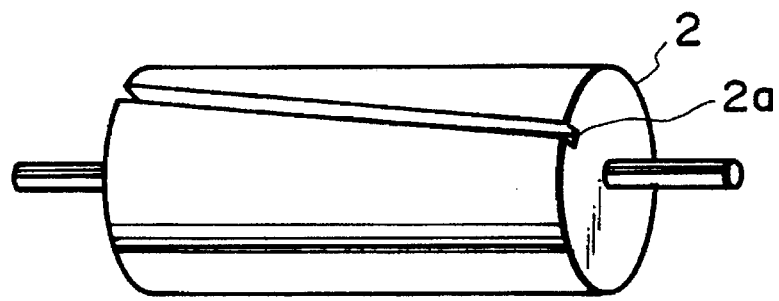
FIG. 2 is a perspective view of the extension roller in FIG. 1.
Figure 3:
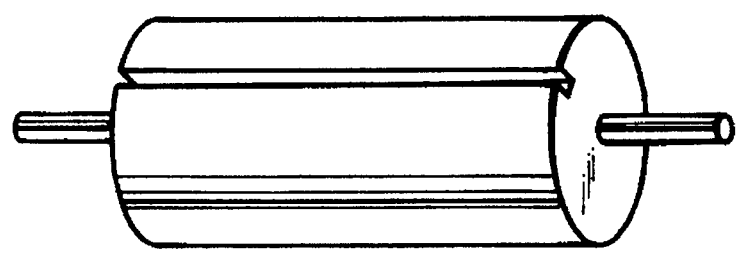
FIG. 3 is a perspective view of another extension roller usable in the apparatus of FIG. 1.

In this instance, the groove 2a of the extension roller 2 can be formed in parallel with the rotation axis of the roller 2 as shown in FIG. 3 but may preferably be formed obliquely with respect to the rotation axis of the roller 2 as shown in FIG. 2 in view of the ink-scraping effect and the protection of the doctor blade 1.

Figure 4A:
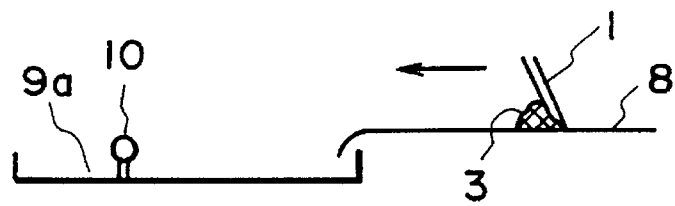
FIGS. 4A, 4B, 4C, 4D and 4E are side views for illustrating the extending and ink-removing actions of an extension plate in a flexographic apparatus according to another embodiment of the present invention.
Figure 4B:
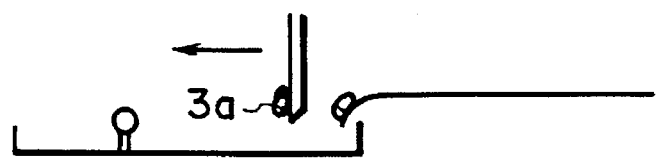
Figure 4C:
Figure 6:
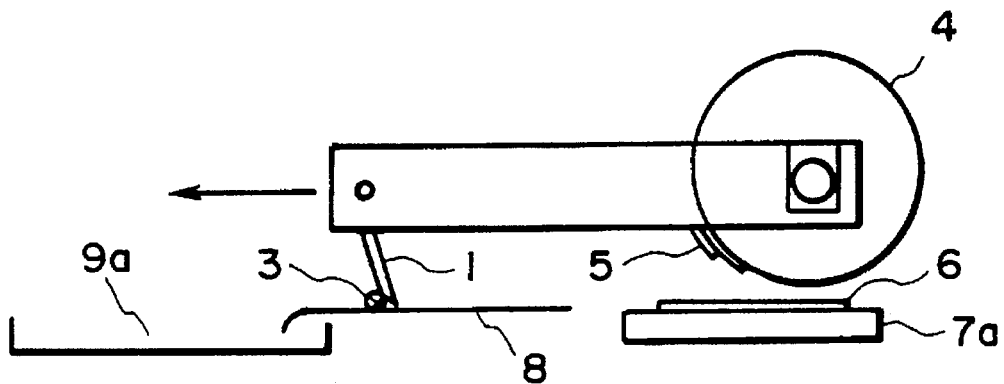
FIG. 6 is a side view for illustrating an extending operation of another printing mechanism used in a conventional flexographic apparatus.
Figure 7:
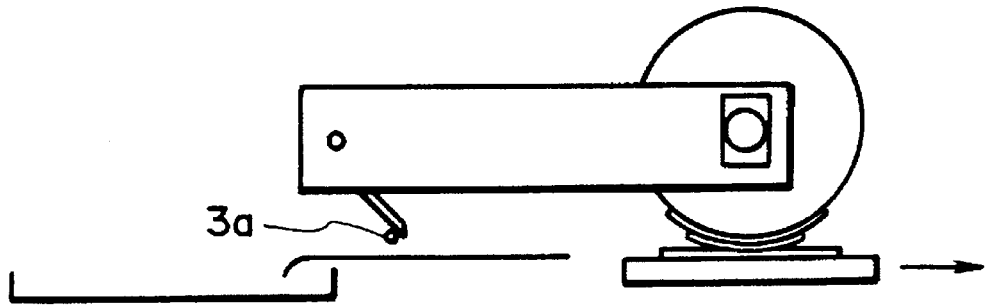
FIG. 7 is a side view for illustrating a printing operation of the printing mechanism shown in FIG. 6.

FIGS. 4A, 4B, 4C, 4D and 4E are side views for illustrating a structure and a series of action of a printing mechanism, particularly an extension mechanism, in a flexographic apparatus according to another embodiment of the present invention. FIG. 4A shows a state of extension, and FIG. 4C shows a state of scraping-off. Referring to FIGS. 4A, 4B, 4C, 4D and 4E, the mechanism includes a doctor blade 1, an extension plate 8, an ink receiver pan 9a and an ink-removing member 10. The mechanism is suitably used in a printing apparatus of the type using an extension plate as shown in FIGS. 6 and 7. As shown in FIG. 4A in comparison with FIG. 6, for example, the mechanism is provided with an ink-removing member 10 in the ink receiver pan 9a. In a specific embodiment, the ink-removing member 10 was formed as a cylindrical bar of polyester.

Figure 4D:
Figure 4E:

As a result, it has become possible to prevent an excess 3a of the ink attached to the tip of the doctor blade 1 from falling on the extension plate in a printing step as shown in FIG. 7 (corresponding to FIG. 4E) by scraping the excess off by the ink-removing member 10 in advance (FIGS. 4B, 4C and 4D).

As described hereinabove, according to the present invention, a means for removing an excess of ink from an ink-extender member and an ink extension member is provided, whereby a transfer printing apparatus has become applicable to a wider scope of materials or inks having a broader viscosity range, thus resulting in an enhanced productivity.

What is claimed is:

1. A process for producing a liquid crystal device comprising a liquid crystal disposed between a pair of substrates including a coated substrate, said process comprising the steps of:

selecting a transfer printing apparatus comprising a projecting extender, an extension member for extending an ink thereon in association with the projecting extender, a printing plate for taking up the extended ink and transferring the ink to a substrate for providing said coated substrate, and removal means for removing an excess of the ink after extension from the projecting extender;

applying a solution of an organic polymer or an inorganic oxide precursor onto the extension member;

extending the applied solution on the extension member using the projecting extender;

removing an excess of the extended solution after extension by the projecting extender;

causing the printing plate to contact the extension member and transferring the extended solution to the substrate by the printing plate; and forming a film of the organic polymer or inorganic oxide on the substrate.

2. A process according to claim 1, wherein said projecting extender is a blade.

3. A process according to claim 1, wherein said extension member comprises an extension roller and said removal means comprises a groove provided in the surface of the extension roller.

4. A process according to claim 3, wherein said groove is formed obliquely with respect to the rotation axis of the extension roller.

5. A process according to claim 1, wherein said extension member comprising an extension plate and said removal means contacts the extender to scrape off excess ink after an extension operation.

6. A process according to claim 5, wherein said removal means comprises a cylindrical bar formed of a synthetic resin disposed in an ink-receiver pan.

* * * * *

UNITED STATES PATENT AND TRADEMARK OFFICE
CERTIFICATE OF CORRECTION

PATENT NO. : 5,639,511

DATED : June 17, 1997

INVENTOR(S) : YASUYUKI WATANABE ET AL.          Page 1 of 1

It is certified that error appears in the above-identified patent and that said Letters Patent is hereby corrected as shown below:

COLUMN 1

```
   Line 58, "plate 8" should read --plate 6--.
```

Signed and Sealed this

Ninth Day of December, 1997

Attest:

BRUCE LEHMAN

Attesting Officer         Commissioner of Patents and Trademarks